(12) United States Patent
Chakraborty (10) Patent No.: US 6,707,932 B1
(45) Date of Patent: Mar. 16, 2004

(54) METHOD FOR IDENTIFYING GRAPHICAL OBJECTS IN LARGE ENGINEERING DRAWINGS

(75) Inventor: Amit Chakraborty, Cranberry, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 589 days.

(21) Appl. No.: 09/609,206

(22) Filed: Jun. 30, 2000

(51) Int. Cl.⁷ .............................. G06K 9/00; G06K 9/62
(52) U.S. Cl. ........................ 382/113; 382/209
(58) Field of Search ................... 382/113, 209, 382/217, 240, 244, 283

(56) References Cited

U.S. PATENT DOCUMENTS

| | | | |
|---|---|---|---|
| 4,930,022 A | * 5/1990 | Kubota | 358/451 |
| 5,101,443 A | * 3/1992 | Behrmann-Poitiers | 382/299 |
| 5,351,095 A | * 9/1994 | Kerdranvat | 348/699 |
| 5,794,257 A | 8/1998 | Liu et al. | 707/501 |
| 5,995,659 A | 11/1999 | Chakraborty et al. | 382/176 |
| 6,154,754 A | 11/2000 | Hsu et al. | 707/513 |
| 6,272,247 B1 | * 8/2001 | Manickam et al. | 382/217 |
| 6,373,988 B1 | * 4/2002 | Thorell et al. | 382/240 |

OTHER PUBLICATIONS

"Quadtree–Structured Recursive Plane Decomposition Coding of Images", Peter Strobach, IEEE Transactions on signal processing, VOL 39, NO. 6, Jun. 1991.*
"Efficient Quadtree Coding of Images and Video", Gary J. Sullivan, IEEE Transactions on image processing, VO1 3. No. 3, May 1994.*
Patent application Ser. No.: 09/607,886 Atty Dkt. No.: 00P7773US.
Patent application Ser. No.: 10/007,373 Atty Dkt. No.: 00P9093US01.
Patent application Ser. No.: 09/904,092 Atty Dkt. No.: 00P9094US01.
Patent application Ser. No.: 09/996,271 Atty Dkt. No.: 00P9096US01.

* cited by examiner

Primary Examiner—Leo Boudreau
Assistant Examiner—Tom Y. Lu (57) ABSTRACT

A method for identifying graphical objects in large engineering drawings, comprises the steps of inputting an original image into a computerized system for image processing; pruning the original image to provide a pruned image; inputting a template image; processing the template image to provide a processed template image; and computing matches between the pruned image and the processed template image.

12 Claims, 6 Drawing Sheets

METHOD FOR IDENTIFYING GRAPHICAL OBJECTS IN LARGE ENGINEERING DRAWINGS

BACKGROUND OF THE INVENTION

Document processing and understanding is important for a variety of applications such as office automation, creation of electronic manuals, online documentation and annotation, and so forth. However, the understanding and identifying of graphical objects in large engineering drawings which often can be of the order of 10000×10000 pixels using traditional methods can be a very challenging and time consuming task due to the sheer size.

In spite of the use of electronic documents there does not appear to have been any significant decrease in the use of paper based documents. In fact, their volume appears to have increased, influenced by an apparently general preference for paper documents for reading and archiving purposes. In a similar way as newspapers remained popular even after the introduction of radio and television broadcasting, and the Web, paper documents remain in widespread use.

However, storing and analyzing paper documents and, more importantly, retrieving them, are a very cumbersome tasks. Electronic documents have the advantage that they can be easily manipulated and readily analyzed. Consequently, transformation of paper documents to electronic form has become an important goal. It is herein recognized that this is a non trivial task and it has been observed, such as in Tang et al., "Multiresolution analysis in extraction of reference lines from documents with gray level backgrounds", IEEE Transactions on Pattern Analysis and Machine Intelligence, pp. 921–925, 1997, that it is almost impossible to develop a general system that can process all kinds of documents, such as technical reports, engineering drawings, books, journals, newspapers etc. Rather, the research community normally focuses on a specific application so that one can make best use of the inherent properties and the major characteristics of the particular type of document under consideration.

SUMMARY OF THE INVENTION

In accordance with an aspect of the invention, a method for identifying graphical objects in large engineering drawings comprises the steps of inputting an original image into a computerized system for image processing; pruning the original image to provide a pruned image; inputting a template image; processing the template image to provide a processed template image; and computing matches between the pruned image and the processed template image.

BRIEF DESCRIPTION OF THE DRAWINGS

The invention will be more fully understood from the following detailed description of preferred embodiments, in conjunction with the Drawing, in which.

DETAILED DESCRIPTION OF THE PREFERRED EMBODIMENTS

A method in accordance with the principles of the present invention circumvents that by using a hierarchical bottom-up approach for recognizing graphical objects. The speedup is almost of the order of 1000 and this is achieved by following a strategy that exploits the characteristics of such diagrams such as low pixel density.

The present invention is concerned with engineering drawings which have been scanned in and an objective of the present invention is to solve the task of recognition and extraction of graphical objects. However a simple pattern matching, such as in Jain, "Fundamentals of Digital Image Processing", Prentice Hall, 1989, is inadequate primarily because of the special nature of these images being very large, such as $10^8$ pixels, for example. A simple pattern matching, which has a computational complexity of $O(n^2)$ will be prohibitively expensive for an image of that size. Also to be noted is the fact that these images are often binary in nature and thus a simple coarse to fine strategy is unlikely to work as these images primarily comprise line drawings which under smoothing using the normal scale-space procedure can lose the underlying information, such as cited in Witkin, "Scale-space filtering", Proceedings, International Joint Conference on Artificial Intelligence, pp. 1019–1022, 1983. Further, smoothing would convert the binary image to a grey-level one, thus contributing towards an increase in the computational complexity.

In accordance with another aspect of the invention, a novel strategy is used, keeping in mind the special nature of these images. A coarse to fine strategy is used to rule out areas that are absolutely unlikely to be potential candidates for a match. Very large blocks are used to quickly rule out implausible candidate areas. As will be further explained, the principles in accordance with the present invention are significantly different as compared with the normal scale-space scenario. Once this is done, an attempt is made to match the template to the candidate areas, but here too, rather than computing the correlation for all the points, only those are selected that are black, resulting in a huge speedup. However, this does create a small overhead which is more than compensated by the sparse nature of these images. Also, a coarse to fine strategy is employed, albeit on a smaller scale, resulting in a further advantage with regards to the computational complexity.

However, in itself the problem per se is not new. Recognition of objects and patterns from images have been around almost since the inception of the field of image processing, such as shown in Jain, "Fundamentals of Digital Image Processing, Prentice Hall, 1989; Rosenfeld et al., "Digital Picture Processing, $2^{nd}$ ed., Academic Press, New York, $2^{nd}$ edition, 1982; and Haralick et al., "Survey, image segmentation techniques", Computer Vision, Graphics and Image Processing, 29:100–132, 1985. Typically the location of a known template in an image can be found by computing the correlation of the template and image at all the image points. The correlation is maximum at the point where the object is located. Often the method used to obtain these locations is the so-called Sum Squared Difference (SSD) method, such as shown in Horn et al., "Determining Optical Flow", Artificial Intelligence, 17:185–203, 1981. At the match point the SSD goes to zero (maximum correlation). However it need not be zero due to the presence of noise. This method is assumed to be optimal under the presence of Gaussian noise. However, if the images are tainted by the presence of colored noise, i.e. the noise spectrum is non-uniform, then the use of Matched Filtering is advocated, such as shown in Jain, "Fundamentals of Digital Image Processing", Prentice Hall, 1989. The matched filtering problem aims at finding a linear filter that maximizes the output signal to noise ratio where the signal is the observation, i.e. the template image and noise. The linear filter's transfer function is given by the area in the target image against which the template is being compared. It can be shown that the match occurs at those points that the template matches best with the image. The parameter over which the filter output is optimized is the displacement. Thus the matched filter can be implemented as an area correlator with a preprocessing filter. For the case of Gaussian noise, this filter is identity.

Now as for the method of the search itself in accordance with the principles of the invention, there are two different approaches. The easiest one is the direct search approach, such as shown in Jain et al, "Displacement measurement and its application in image coding", IEEE Transactions on Communications, 1799–1808, 1981. However, this is feasible only for relatively small images due to the computational complexity ($O(n^2)$ for an n×n search area) as described before. Two dimensional logarithmic search methods (which have a much lower logarithmic complexity) can be used to significantly reduce the computational overhead, such as in the afore-mentioned article to Jain et al. However for the class of images of interest, this is inapplicable as the function that is minimized is not convex even locally for the domain representing the capture region. Thus, the gradient of the search error at any location does not necessarily indicate the direction in which the search should progress. These methods are more appropriate for images with gray values. A hierarchical coarse-to-fine strategy is employed when the observed image is very large for a logarithmic efficiency. First a coarse version of the image is compared against a similar coarse version of the template. For all areas of potential match, searching is done in the next higher resolution and so on, such as shown in Jain, "Fundamentals of Digital Image Processing", Prentice Hall, 1989. The main idea behind the use of this so called scale space procedure is that important signal features would persist through the coarse to fine scales even if their location might be distorted somewhat. Thus they can be tracked back down the scale path to be located exactly in the zero scale. The most important part of the scale space theory is the so called causality or monotonicity property which states that any feature once present at some scale must also be present at lower scales, such as shown in Jackway et al., "Scale space properties of the multiscale morphological dilation-erosion", IEEE Transactions on Pattern Analysis and Machine Intelligence, pp. 38–51, 1996; Babaud et al., "Uniqueness of the gaussian kernal for scale space filtering", IEEE Transactions on Pattern Analysis and Machine Intelligence", 8, 1986; and Perona et al., "Scale-space and edge detection using anisotropic diffussion", IEEE Transactions on Pattern Analysis and Machine Intelligence", 12:629–639, 1990. There are a certain problems in directly applying these methods to images comprising engineering drawings. One is that an image of a higher scale is obtained by the Gaussian smoothing of the image at the lower scale. Since we need to have the image processed and stored at several scales, for a large image this involves a large memory requirement and also significant computation for the Gaussian smoothing. Further, for the case of binary images that might be sparse, this might actually increase the computational overhead because all the intermediate images are no longer binary. Also, this is likely to result in too many mismatches at the higher scales because of the binary nature of the original image, thus further eroding the potential computational advantage. There are other multi-resolution approaches as well, such as shown in Tang et al., "Multi-resolution analysis in extraction of reference lines from documents with gray level backgrounds", IEEE Transactions on Pattern Analysis and Machine Intelligence, pp. 921–925, 1997; and Mallat, "A theory of multiresolution signal decomposition: The wavelet representation", IEEE Transactions on Pattern Analysis and Machine Intelligence, 11:674–693, 1989, which are also ill-suited for the current application due to the above mentioned reasons.

Figure 1:
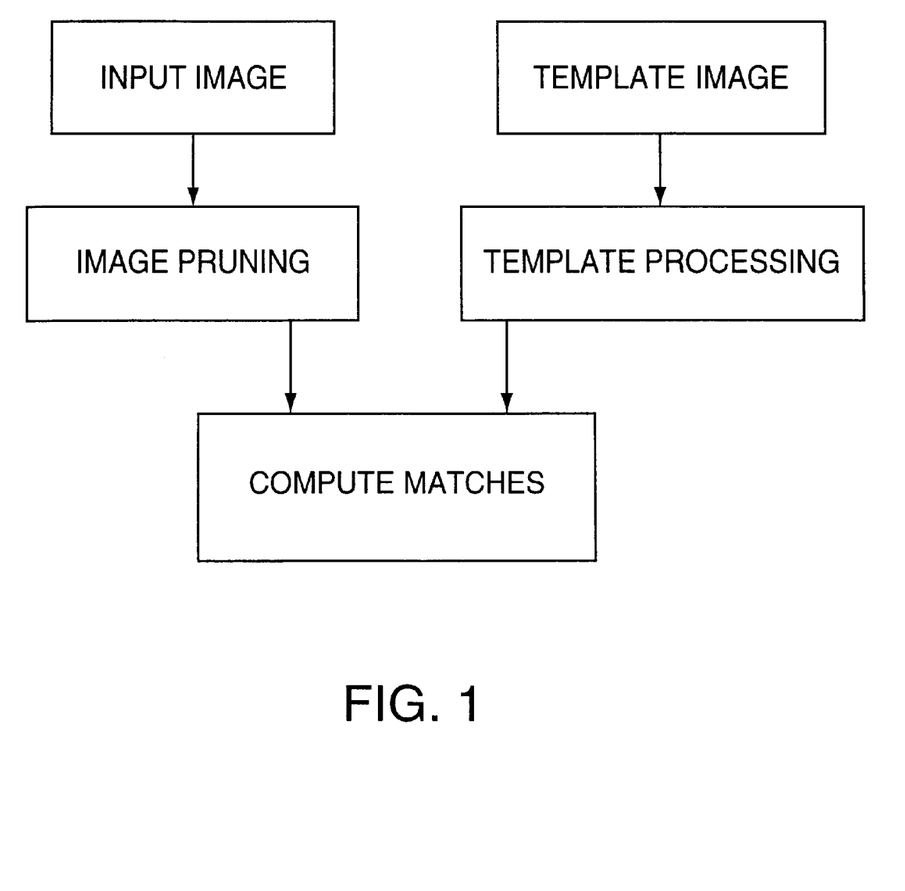
FIGS. 1–4 show flow charts indicating details of the method in accordance with the principles of the invention.

In accordance with the principles of the present invention, a flow chart showing the main stages in the graphics recognition process is shown in FIG. 1. As discussed before, the input to the system is the scanned image of mechanized drawings. In the first step, we quickly rule out areas that are not likely to be candidates for the match. In the next step, we go down a further coarse to fine strategy to identify the potential matches and then finally test them in the finest scale to confirm the matches. For the case of rotations, we need to rotate the template and perform the second step.

Figure 2A:
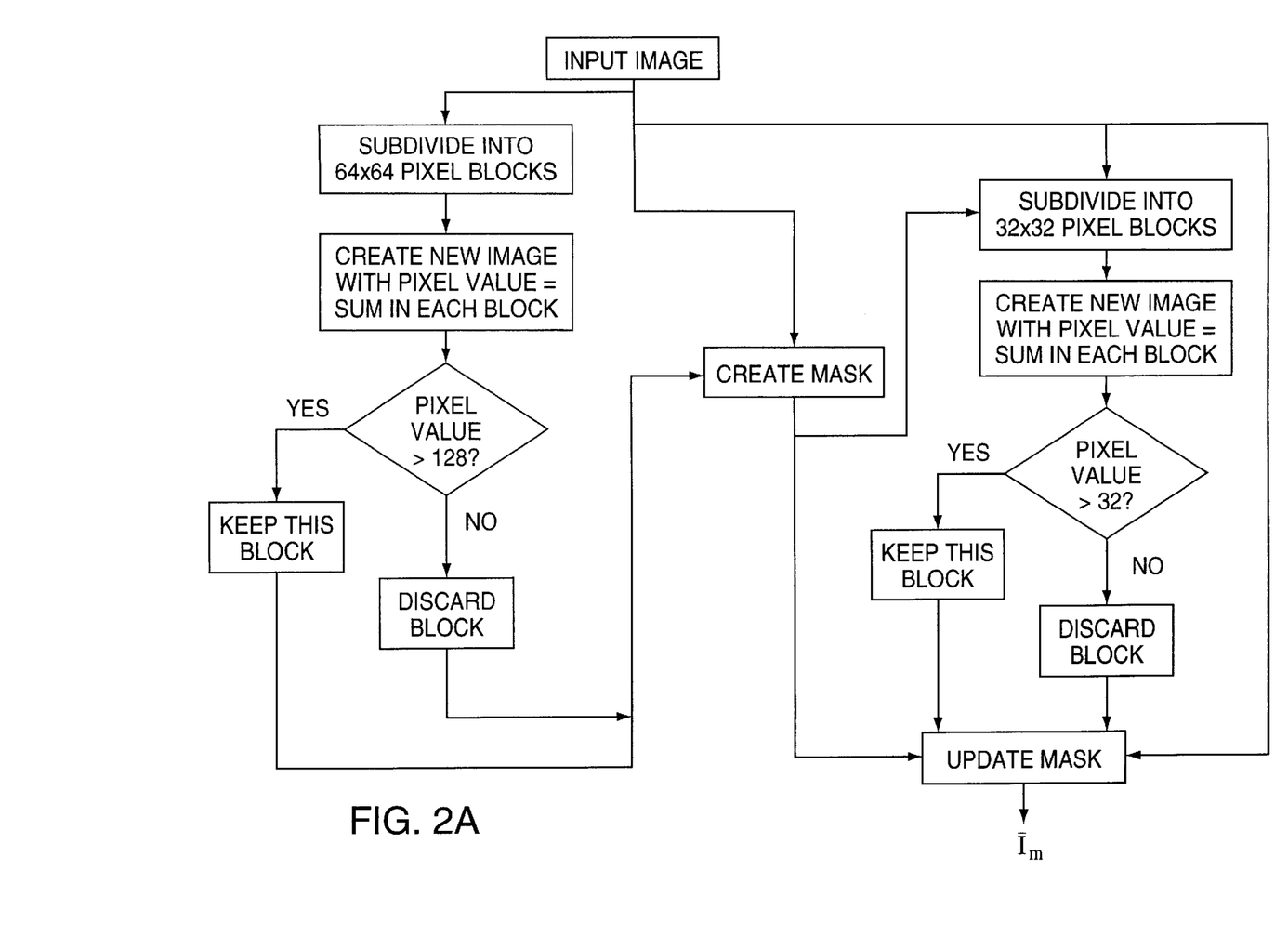
Figure 2B:
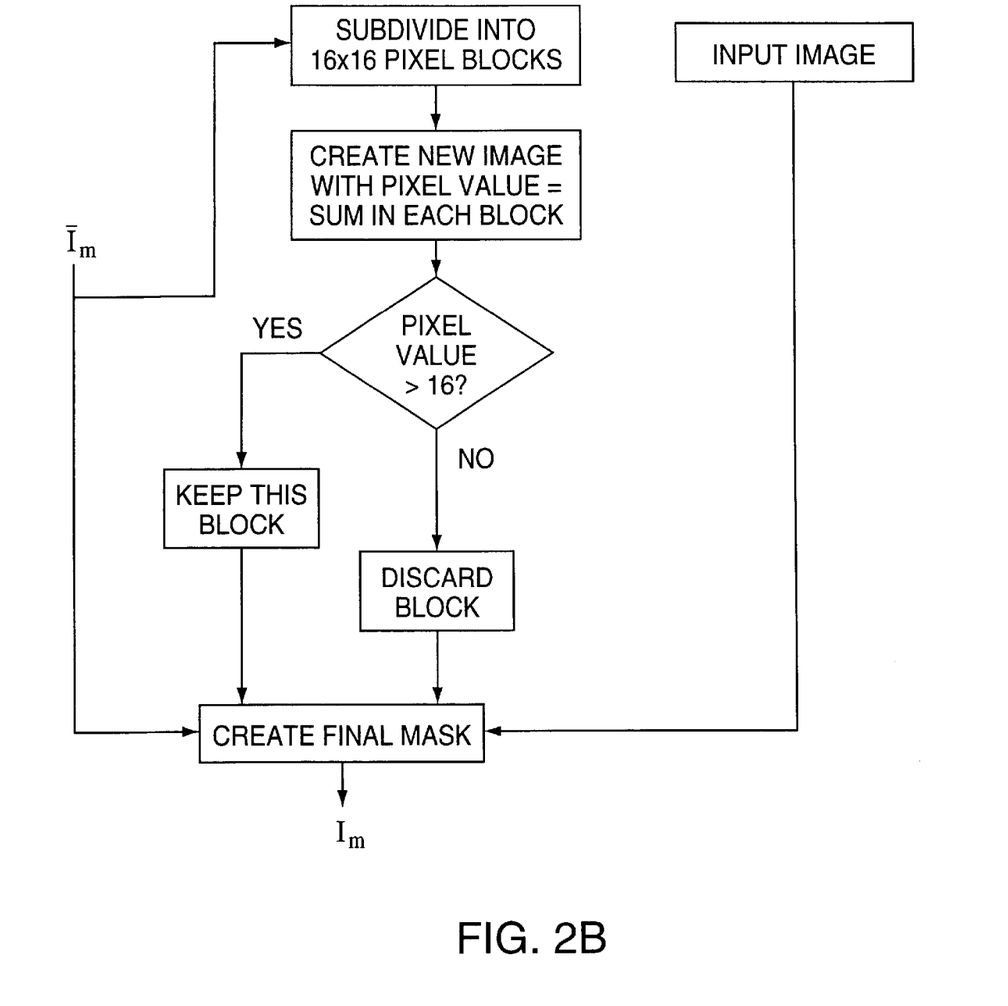

As mentioned before, the main purpose of the Image Pruning step is to quickly rule out areas that are unlikely to be candidate match areas. See FIG. 2.

The input image is a collection of binary bits compressed using the Tif format. Since this is often too large to visualize such a large image, we scale it down to 1/16th of the original size. One easy way to scale it down would be just to consider 1 out of every 4 pixels in both, the x and y direction. However, the resultant image becomes spotty and broken. To avoid this, in accordance with the principles of the present invention, we first promote the image to gray level from binary, and then re-threshold it adaptively to binary. This significantly improves the quality of the scaled down image. The threshold value is computed adaptively for a local window. The result is that at the conclusion of this step, we once again end up with a binary image, albeit a much smaller one, hereinafter referred to as image I.

The next step in accordance with the principles of the invention is to subdivide the output image obtained from the previous step into 64×64 blocks. Actually we create an image $I_{64}$ where each pixel corresponds to a 64×64 block of I. The value of each pixel is equal to the number of black pixels in the 64×64 block. Once this is created, for each pixel in $I_{64}$ we check whether the pixel value is larger than a predetermined threshold. If so, then we keep the corresponding block in I for further consideration, else it is not considered further any more. The choice of the threshold can be dependent on the template, but can be made independent of it as well. If we know the template in advance, and if we find it busy, that is, if there are a relatively large number of black pixels, we would use a higher threshold than when we don't know the template a priori. Otherwise we use a value of the threshold to be 128 which represents two lines across the block. Thus the assumption is that the template is likely to be more than just two lines. Clearly, it is entirely possible that we might miss small parts of a pattern, but as we will see later, as long as some parts of the pattern as it appears in the image is still under consideration, we can still retrieve the object location.

Following the above, the rest of the image I that is still under consideration, after having ruled out areas for further consideration, is now subdivided into 32×32 blocks. Likewise in the previous case, we end up with an image $I_{32}$ where each pixel corresponds to a 32×32 block of I and the value of each pixel is equal to the number of black pixels in the 32×32 block. Once again, we check to see if for each pixel in $I_{32}$ the value is larger than a predetermined threshold. If so, we keep the corresponding block in I for further consideration, else it is not considered further. Once again, the choice of the threshold may or may not be dependent on the template under consideration. If we do not have the template a priori, we choose a threshold of 32, that is, the assumption being that the pattern within this window must be more than just a line.

The above step is repeated one more time for the rest of the image that is still under consideration after the above two steps where the block size is 16×16, and the threshold is 16. As in the previous steps, a larger threshold can be selected if the template is known and it warrants it.

Thus in the end we now have partitioned the image I into two areas, one that we will consider for further matching, and the other that is not. In other words, we have now created a mask $I_m$ for the original image.

With regard to the Template Processing in accordance with the principles of the present invention, it is noted that directly correlating the template with the image even after the mask has been created, for all possible points is still an expensive and time consuming task, given the size of the images. To further simplify, we process the template. Since the template is assumed to be small, processing it is considered computationally cheap. The template is processed in three scales. See FIG. 3.

Figure 3:
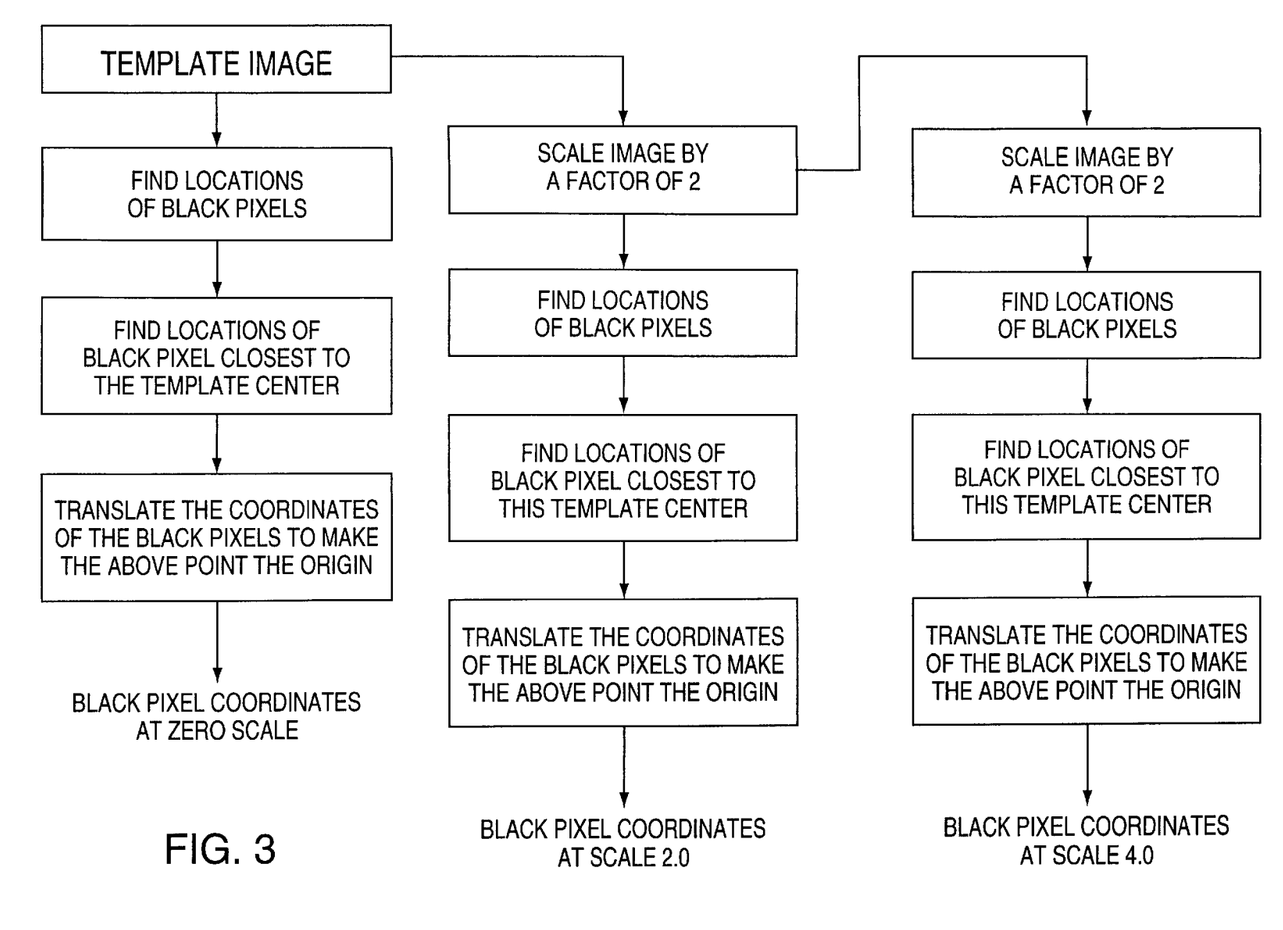

The input template is first scanned for locations of black pixels which are stored in an memory array $\{x_i\ y_i\}$. Next, among this array we locate the black point that is closest to the template center. If W and H are the width and height of the template, then the template center is W/2, H/2 and the closest black pixel is given by:

$$(x_c, y_c) = \mathrm{argmin}_{i \in (1,N)}[(x_i - W/2)^2 + (y_i - H/2)^2]$$

Now, once we have $x_c$, $y_c$, we translate the coordinates of the black pixel array so that this point becomes the origin. Thus, we compute the array:

$$(X_i, Y_i) = (x_i - x_c, y_i - y_c) \qquad i \in (1,N)$$

This was done on the original template, i.e. at the finest scale or a scale 0. Thus, let us rename the associated coordinate array as: $(X_i^0, Y_i^0)\ i \in (1,N^0)$ and the template image at this scale as $I_t^0$.

Next, the template is scaled down by a factor of two on both sides by simple downsampling. Hence, we create an image $I_t^2$ by simply discarding every other pixel in both, the x and y directions. This image area is a quarter of the original image and is of width W/2 and height W/2. Once again, we can repeat the same steps as before for this image, i.e. first locate all the black pixels, find out the black pixel closest to its center (W/4,H/4) and then translate accordingly to get the associated coordinate array $(X_i^2, Y_i^2) i \in (1,N^2)$.

We then repeat the same step for one more scale. Thus this image $I_t^4$ is obtained from $I_t^2$ by discarding every other pixel in both, the x and y directions. Once again, we obtain an associated set of black pixel coordinate array $(X_i^4, Y_i^4) i \in (1, N^4)$.

Figure 4A:
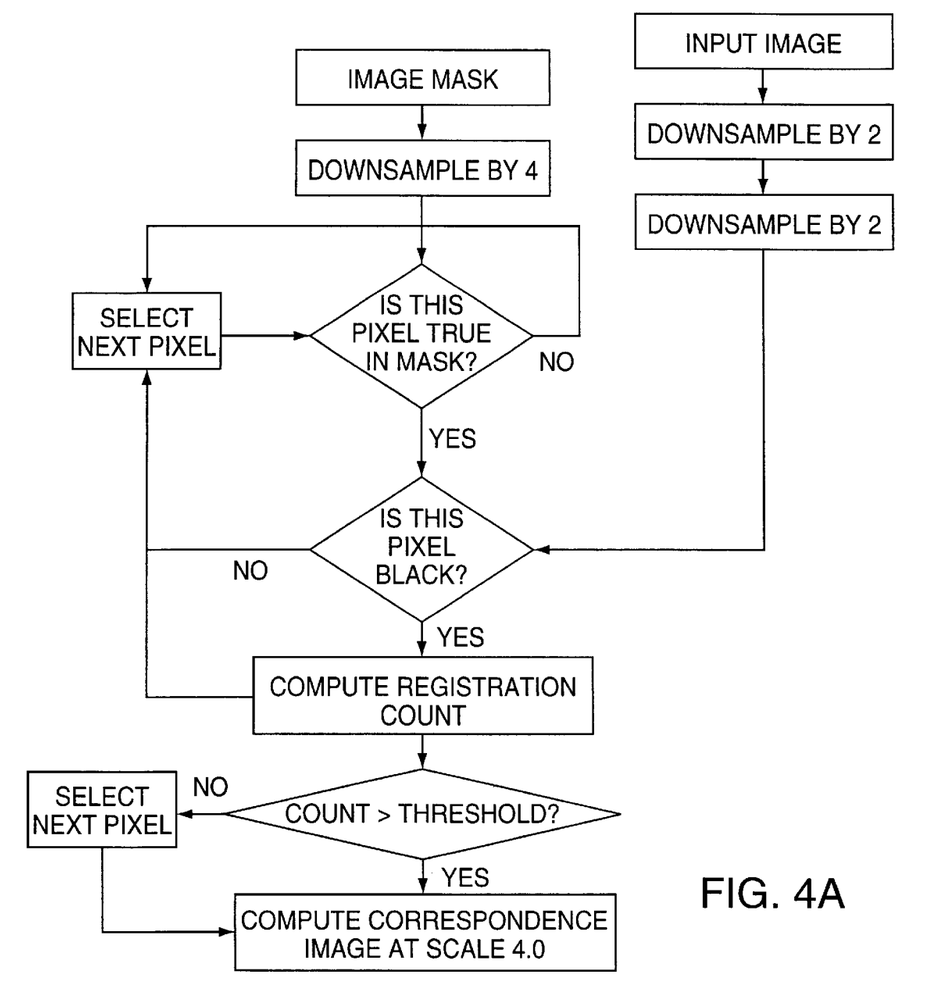
Figure 4B:
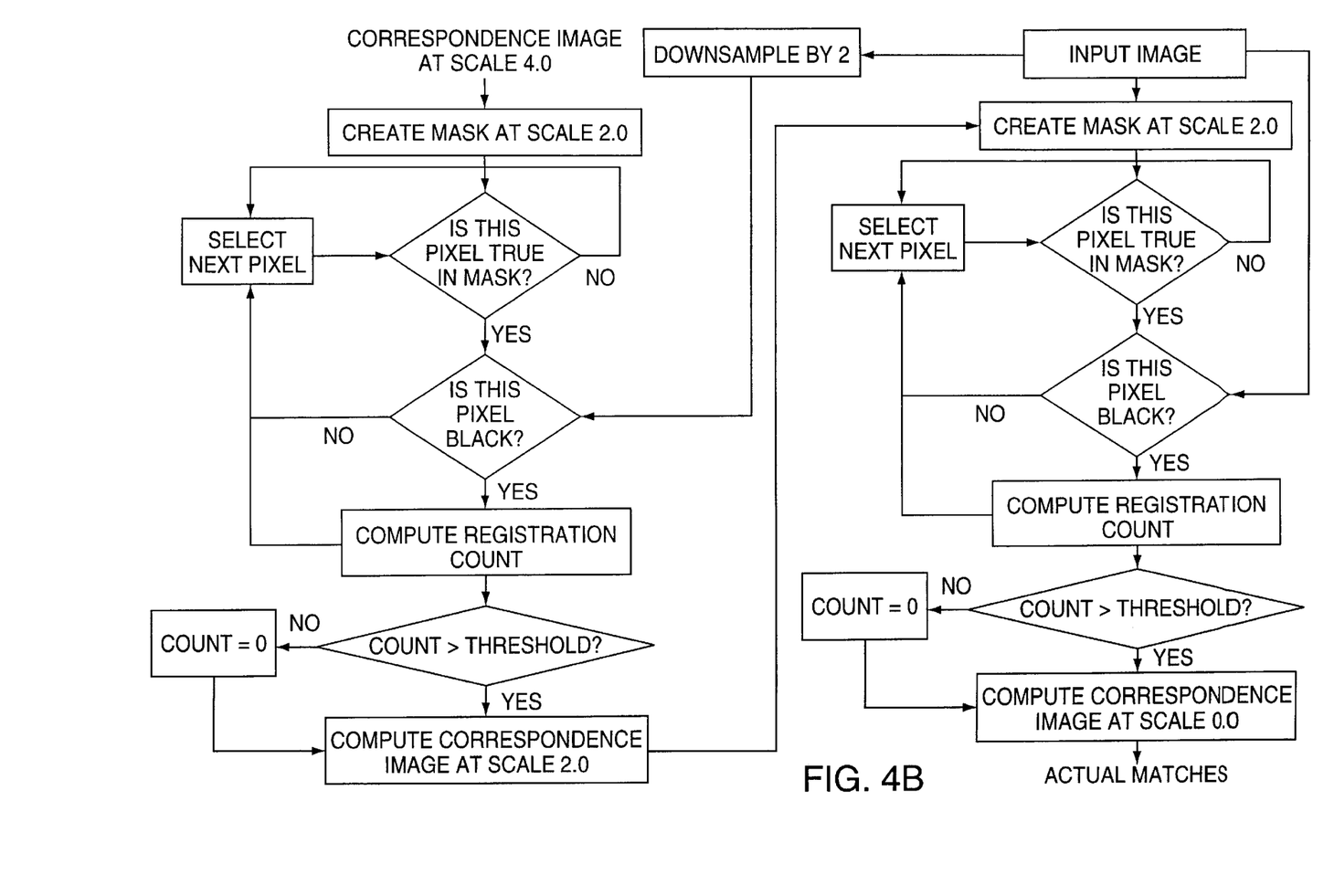

The template now having been prepared and the original image or at least created a mask for it, we are now ready to compute the actual match locations. See FIG. 4.

As a first step we downsample the original image I to compute $I^0$ (at scale 0, $I^0$=I), $I^2$ computed by ignoring every other pixel in both, x and y directions and $I^4$ computed from $I^2$ by ignoring every other pixel in both, x and y directions. We also create the corresponding masks $I_m^0$, $I_m^2$, $I_m^4$.

We start with the coarsest scale. As input, we have the image $I^4$, the corresponding mask $_m^4$ and the black pixel coordinate array at this scale $(X_i^4, Y_i^4) i \in (1,N^4)$. For points within the mask, we first check if there is a black pixel in $I^4$. If so, we try to check if this may be the location where the template might fit. To check this, we register this point to the origin of the template as calculated before for this scale. Then we check to see if, at the coordinate locations of the template where they are black, the image $I^4$ also has black pixels. For every pixel match (i.e. black to black), we increment by 1 a counter n which is originally set to zero. Clearly $n \leq N^4$. Thus, $$N_{\alpha,\beta} = \sum_{i \in (1,N^4)} U(I(\alpha + X_i^4, \beta + Y_i^4))$$

where U(z)=1 if z corresponds to a black pixel. Note further that $n_{\alpha\beta}$ corresponds to an image array with dimensions equal to that of $I^4$.

Now, for each pixel on this new image, we test to see if $n_{\alpha\beta} > 0.6\ N^4$. If not, we set it to zero. Let us call this image $n^4$ since that is the scale to which it corresponds. It is also apparent that each pixel in this image corresponds to four pixels in the next lower scale. This will now be used as a mask for that scale.

Next we concentrate on the next lower scale. The input is $I^2$, the output of the previous scale $n^4$ and the black pixel coordinate array $(X_i^2, y_i^2)\ i \in (1, N^2)$. For each pixel in $n^4$ that is non-zero, we find the four corresponding pixels in I2 and check to see if any of them are black. If so, then we register this pixel to the origin of the template coordinate space as in the previous case and compute the registration count at this location in the same manner as before. Once again, we test the pixel values against a threshold, similarly computed 0.7 $N^2$. The threshold is higher in this case as more accuracy is expected in a finer scale. This then gives us the mask for the next scale which also happens to be the zero scale or the original scale.

A similar process as above is followed. The threshold is set at 0.8 $N^0$. The points that are above this threshold correspond to actual matches where the template can be found.

If we are looking for rotated or scaled templates, we simply rotate and scale the template and try to go through this process.

This method provides a unique way of pruning down a very large image of an engineering drawing to find areas that are likely to have potential matches rather than having to search the whole image for plausible matches. It is important to remember that the images are often of the order of $10^8$ pixels and any regular search would be very expensive and time consuming, if it is at all possible in a practicable sense probably impossible.

A coarse to fine strategy as conventionally known in the prior art would likely not result in significant improvement of computational complexity as the binary nature will be lost and thus result in significant computational and memory requirement. Instead of trying to match the template to the image directly, the method in accordance with the present invention also applies a coarse to fine strategy, but with a major difference in strategy as compared with prior art methods.

The black pixel locations are actually saved at different scales and translate the coordinate system to a point close to the origin. During matching it is thus only required to compute only a few operations, equal to the number of points in the black pixel array for that scale, and only for the black pixels that are within the mask (apriori generated). This results in the fact that the computational complexity is only a fraction of the case that would be required if it were done without this strategy.

For a typical image, we have observed that the speedup is of the order of 1000 or more. Clearly, larger the image and sparser it is, the greater is the speedup.

While the invention has been described by way of exemplary embodiments, it will be understood by those of skill in the art to which it pertains that various changes and modifications may be made without departing from the spirit of the invention which is defined by the claims following.

What is claimed is:

1. A method for identifying graphical objects in large engineering drawings, comprising the steps of
inputting an original image into a computerized system for image processing;
pruning said original image to provide a pruned image;
inputting a template image;
processing said template image to provide a processed template image; and
computing matches between said pruned image and said processed template image, wherein said step of pruning said original image comprises the steps of:
subdividing said original image into first pixel blocks;
creating a first new image with pixel value equal to the sum in each block of said first blocks;
making a first determination based on pixel value whether to keep or discard a respective block of said first blocks;
when said first determination is to keep a block, creating a mask utilizing data of said image;
thereupon subdividing said first new image into second pixel blocks, said second pixel blocks being of smaller size than said first pixel blocks;
creating a second new image with pixel value equal to the sum in each block of said second blocks;
making a second determination based on pixel value whether to keep or discard a respective block of said second blocks;
when said first determination is to keep a block, updating said mask to provide an updated mask;
deriving a masked image from said updated mask;
subdividing said masked image into third pixel blocks;
creating a third new image with pixel value equal to the sum in each block of said third pixel blocks;
making a third determination based on pixel value whether to keep or discard a respective block of said third pixel blocks; and
when said first determination is to keep a block, creating a final mask utilizing data of said image.

2. A method for identifying graphical objects in accordance with claim 1, wherein said step of making said first and second determination based on pixel value whether to keep or discard a respective block of said first blocks and second blocks, respectively, comprises;
making a determination as to whether pixel value is greater or less than a respective threshold number derived from said respective pixel values; and
whenever said pixel value exceeds said respective threshold number, keeping said respective block and otherwise discarding said respective block.

3. A method for identifying graphical objects in accordance with claim 2, wherein said respective threshold numbers are 128, 32, and 16, respectively.

4. A method for identifying graphical objects in accordance with claim 2, wherein said respective threshold numbers are greater than 128, 32, and 16, respectively.

5. A method for identifying graphical objects in accordance with claim 1, wherein said step of processing said template image to provide a processed template image comprises the steps of:
finding locations of black pixels in said template image;
finding the location of a black pixel closest to a template center;
translating coordinates of said black pixels so as to place the coordinate origin at said location of a black pixel closest to said template center, resulting in black pixel coordinates at zero scale;
scaling said template image by a factor of 2, resulting in a scaled down template image;
finding locations of black pixels in said scaled down template image;
finding the location of a black pixel closest to said scaled down template center;
translating coordinates of said black pixels so as to place the coordinate origin at said location of a black pixel closest to said scaled down template corner, resulting in black pixel coordinates at a scale of 2.0;
scaling said scaled down template image by a factor of 2, resulting in a further scaled down template image;
finding locations of black pixels in said further scaled down template image;
finding the location of a black pixel closest to said further scaled down template center;
translating coordinates of said black pixels so as to place the coordinate origin at said location of a black pixel closest to said further scaled down template center, resulting in black pixel coordinates at a scale of 4.0.

6. A method for identifying graphical objects in accordance with claim 5, wherein said step of computing matches between said pruned image and said processed template image comprises the steps of:
successively downsampling said original image by an overall factor of 4 to result in a downsampled by 4 image;
downsampling said final image mask by said factor of 4;
making a pixel by pixel determination as to whether a given pixel is true in said final mask and for each pixel that is true, making a comparison with said downsized image to determine whether that pixel is black and for each such pixel that is black, computing a registration count;
whenever said registration count exceeds a given threshold, computing a correspondence image at scale 4.0, and when it does not, adding a zero count;
downsampling said original image by a factor of 2 to result in an image downsampled by 2;
creating a mask at scale 2.0 from said correspondence image at scale 4.0;
making a pixel by pixel determination as to whether a given pixel is true in said mask at scale 2 and for each pixel that is true, making a comparison with said image downsampled by 2 to determine whether that pixel is black and for each such pixel that is black, computing a registration count;
whenever said registration count exceeds a given threshold, computing a correspondence image at scale 2.0, and when it does not, adding a zero count;
creating a mask at scale 2.0 from said correspondence image at scale 2.0;
making a pixel by pixel determination as to whether a given pixel is true in said mask at scale 2 and for each pixel that is true, making a comparison with said original image to determine whether that pixel is black and for each such pixel that is black, computing a registration count; and whenever said registration count exceeds a given threshold, computing a correspondence image at scale 2.0, and when it does not, adding a zero count so as to thereby obtain actual matches.

7. A storage medium having stored codes executable by a processor to perform a method for identifying graphical objects in large engineering drawings, comprising the steps of:

inputting an original image into a computerized system for image processing;

pruning said original image to provide a pruned image;

inputting a template image;

processing said template image to provide a processed template image; and computing matches between said pruned image and said processed template image, wherein said step of pruning said original image comprises the steps of:

subdividing said original image into first pixel blocks;

creating a first new image with pixel value equal to the sum in each block of said first blocks;

making a first determination based on pixel value whether to keep or discard a respective block of said first blocks;

when said first determination is to keep a block, creating a mask utilizing data of said image;

thereupon subdividing said image into second pixel blocks, said second pixel blocks being of smaller size than said first pixel blocks;

creating a second new image with pixel value equal to the sum in each block of said second blocks;

making a second determination based on pixel value whether to keep or discard a respective block of said second blocks;

when said first determination is to keep a block, updating said mask to provide an updated mask;

deriving a masked image from said updated mask;

subdividing said masked image into third pixel blocks;

creating a third new image with pixel value equal to the sum in each block of said third pixel blocks;

making a third determination based on pixel value whether to keep or discard a respective block of said third pixel blocks; and when said first determination is to keep a block, creating a final mask utilizing data of said image.

8. The storage medium according to claim 7, wherein said step of making said first and second determination based on pixel value whether to keep or discard a respective block of said first blocks and second blocks, respectively, comprises;

making a determination as to whether pixel value is greater or less than a respective threshold number derived from said respective pixel values; and whenever said pixel value exceeds said respective threshold number, keeping said respective block and otherwise discarding said respective block.

9. The storage medium according to claim 7, wherein said respective threshold numbers are 128, 32, and 16, respectively.

10. The storage medium of claim 7, wherein said respective threshold numbers ae greater than 64, 32, and 16, respectively.

11. The storage medium of claim 7, wherein said step of processing said template image to provide a processed template image comprises the steps of:

finding locations of black pixels in said template image;

finding the location of a black pixel closest to said template center;

translating coordinates of said black pixels so as to place the coordinate origin at said location of a black pixel closest to said template center, resulting in black pixel coordinates at zero scale;

scaling said template image by a factor of 2, resulting in a scaled down template image;

finding locations of black pixels in said scaled down template image;

finding the location of a black pixel closest to said scaled down template center;

translating coordinates of said black pixels so as to place the coordinate origin at said location of a black pixel closest to said scaled down template center, resulting in black pixel coordinates at a scale of 2.0;

scaling said scaled down template image by a factor of 2, resulting in a further scaled down template image;

finding locations of black pixels in said further scaled down template image;

finding the location of a black pixel closest to said further scaled down template center;

translating coordinates of said black pixels so as to place the coordinate origin at said location of a black pixel closest to said further scaled down template center, resulting in black pixel coordinates at a scale of 4.0.

12. The storage medium of claim 11, wherein said step of computing matches between said pruned image and said processed template image comprises the steps of:

successively downsampling said original image by an overall factor of 4 to result in a downsampled by 4 image;

downsampling said final image mask by said factor of 4;

making a pixel by pixel determination as to whether a given pixel is true in said final mask and for each pixel that is true, making a comparison with said downsized image to determine whether that pixel is black and for each such pixel that is black, computing a registration count;

whenever said registration count exceeds a given threshold, computing a correspondence image at scale 4.0, and when it does not, adding a zero count;

downsampling said original image by a factor of 2 to result in an image downsampled by 2;

creating a mask at scale 2.0 from said correspondence image at scale 4.0;

making a pixel by pixel determination as to whether a given pixel is true in said mask at scale 2 and for each pixel that is true, making a comparison with said image downsampled by 2 to determine whether that pixel is black and for each such pixel that is black, computing a registration count;

whenever said registration count exceeds a given threshold, computing a correspondence image at scale 2.0, and when it does not, adding a zero count;

creating a mask at scale 2.0 from said correspondence image at scale 2.0;

making a pixel by pixel determination as to whether a given pixel is true in said mask at scale 2 and for each pixel that is true, making a comparison with said original image to determine whether that pixel is black and for each such pixel that is black, computing a registration count;

whenever said registration count exceeds a given threshold, computing a correspondence image at scale 2.0, and when it does not, adding a zero count so as to thereby obtain actual matches.

* * * * *